(12) United States Patent  
D'Souza et al.

(10) Patent No.: US 9,409,150 B2  
(45) Date of Patent: Aug. 9, 2016

(54) CLAY MINERAL SUPPORTED CATALYSTS

(71) Applicant: SABIC Global Technologies B.V., Amsterdam (NL)

(72) Inventors: Lawrence D'Souza, Thuwal (SA); Vinu Viswanath, Thuwal (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 86 days.

(21) Appl. No.: 14/273,208

(22) Filed: May 8, 2014

(65) Prior Publication Data

US 2014/0332725 A1 Nov. 13, 2014

Related U.S. Application Data

(60) Provisional application No. 61/821,514, filed on May 9, 2013.

(51) Int. Cl.
*B01J 21/16* (2006.01)
*B01J 37/02* (2006.01)
(Continued)

(52) U.S. Cl.
CPC *B01J 21/16* (2013.01); *B01J 23/42* (2013.01); *B01J 23/462* (2013.01); *B01J 23/464* (2013.01); *B01J 23/63* (2013.01); *B01J 23/755* (2013.01); *B01J 23/83* (2013.01); *B01J 35/002* (2013.01); *B01J 35/023* (2013.01); *B01J 35/1009* (2013.01); *B01J 35/1014* (2013.01); *B01J 37/0201* (2013.01); *B01J 37/0242* (2013.01); *B01J 37/0244* (2013.01); *B01J 37/08* (2013.01); *C01B 3/40* (2013.01); *B01J 37/088* (2013.01); *B01J 2523/00* (2013.01); *C01B 2203/0233* (2013.01); *C01B 2203/0238* (2013.01); *C01B 2203/0261* (2013.01); *C01B 2203/04* (2013.01); *C01B 2203/1005* (2013.01); *C01B 2203/107* (2013.01); *C01B 2203/1041* (2013.01); *C01B 2203/1052* (2013.01); *C01B 2203/1058* (2013.01); *C01B 2203/1064* (2013.01);
(Continued)

(58) Field of Classification Search
CPC .......................................................... B01J 21/16
See application file for complete search history.

(56) References Cited

U.S. PATENT DOCUMENTS 2,690,963 A   10/1954   Herbst .................. 48/198.6
3,001,953 A    9/1961   Reitmeier et al. ............ 502/72
(Continued)

FOREIGN PATENT DOCUMENTS

JP   2000/061307   2/2000
JP   2008/229486   10/2008
(Continued)

OTHER PUBLICATIONS

International Search Report issued in PCT/IB2014/001762 dated Nov. 20, 2014.
(Continued)

*Primary Examiner* — Paul Wartalowicz
(74) *Attorney, Agent, or Firm* — Norton Rose Fulbright US LLP

(57) ABSTRACT

Disclosed is a hydrocarbon gas reforming supported catalyst, and methods for its use, that includes a catalytic material capable of catalyzing the production of a gaseous mixture comprising hydrogen and carbon monoxide from a hydrocarbon gas, and a clay support material comprising a clay mineral, wherein the catalytic material is attached to the clay support material.

31 Claims, 5 Drawing Sheets

(51) Int. Cl.

| | |
|---|---|
| *B01J 37/08* | (2006.01) |
| *B01J 23/42* | (2006.01) |
| *B01J 23/46* | (2006.01) |
| *B01J 23/63* | (2006.01) |
| *B01J 23/755* | (2006.01) |
| *B01J 23/83* | (2006.01) |
| *B01J 35/00* | (2006.01) |
| *B01J 35/02* | (2006.01) |
| *B01J 35/10* | (2006.01) |
| *C01B 3/40* | (2006.01) |

(52) U.S. Cl.
CPC . *C01B2203/1082* (2013.01); *C01B 2203/1211* (2013.01); *C01B 2203/1217* (2013.01); *C01B 2203/1235* (2013.01); *C01B 2203/1241* (2013.01); *C01B 2203/1247* (2013.01); *C01B 2203/1614* (2013.01); *C01B 2203/1628* (2013.01); *Y02P 20/128* (2015.11)

(56) References Cited

U.S. PATENT DOCUMENTS

| | | | |
|---|---|---|---|
| 3,617,521 A | 11/1971 | Houston et al. | 208/138 |
| 3,650,713 A | 3/1972 | Chinchen et al. | 48/198.7 |
| 3,926,850 A | 12/1975 | Kostka | 502/5 |
| 4,060,498 A | 11/1977 | Kawagoshi et al. | 252/373 |
| 4,363,361 A | 12/1982 | Madgavkar et al. | 166/256 |
| 4,371,452 A | 2/1983 | Ohsaki et al. | 252/373 |
| 4,539,310 A | 9/1985 | Leftin et al. | 502/303 |
| 4,637,992 A | 1/1987 | Lewis et al. | 502/84 |
| 4,693,882 A | 9/1987 | Setzer et al. | 423/652 |
| 4,738,946 A | 4/1988 | Yamashita et al. | 502/303 |
| 4,780,449 A | 10/1988 | Hicks | 502/303 |
| 4,793,797 A | 12/1988 | Kato et al. | 431/7 |
| 4,793,904 A | 12/1988 | Mazanec et al. | 205/334 |
| 4,959,494 A | 9/1990 | Felthouse | 562/515 |
| 4,962,280 A | 10/1990 | Tijburg et al. | 502/439 |
| 4,968,660 A | 11/1990 | Tijburg et al. | 502/303 |
| 4,988,661 A | 1/1991 | Arai et al. | 502/327 |
| 4,990,481 A | 2/1991 | Sato et al. | 502/335 |
| 5,015,461 A | 5/1991 | Jacobson et al. | 423/594.8 |
| 5,100,857 A | 3/1992 | Sato et al. | 502/335 |
| 5,108,979 A | 4/1992 | Magnabosco et al. | 502/304 |
| 5,130,114 A | 7/1992 | Igarashi | 423/652 |
| 5,149,464 A | 9/1992 | Green et al. | 252/373 |
| 5,262,045 A | 11/1993 | Rao et al. | 208/139 |
| 5,268,346 A | 12/1993 | Ino et al. | 502/304 |
| 5,368,835 A | 11/1994 | Choudhary et al. | 423/651 |
| 5,411,927 A | 5/1995 | Choudhary et al. | 502/302 |
| 5,431,855 A | 7/1995 | Green et al. | 252/373 |
| 5,447,705 A | 9/1995 | Petit et al. | 423/418.2 |
| 5,500,149 A | 3/1996 | Green et al. | 252/373 |
| 5,658,497 A | 8/1997 | Kumar et al. | 252/373 |
| 5,679,614 A | 10/1997 | Bangala et al. | 502/302 |
| 5,980,731 A | 11/1999 | Kao et al. | 208/137 |
| 6,238,816 B1 | 5/2001 | Cable et al. | 429/425 |
| 6,409,940 B1 | 6/2002 | Gaffney et al. | 252/373 |
| 6,416,731 B1 | 7/2002 | Dohrup et al. | 423/653 |
| 6,967,063 B2 | 11/2005 | Krumpelt et al. | 429/412 |
| 6,984,371 B2 | 1/2006 | Zhao et al. | 423/651 |
| 7,067,453 B1 | 6/2006 | Ming et al. | 502/304 |
| 7,070,752 B2 | 7/2006 | Zeng et al. | 423/418.2 |
| 7,160,533 B2 | 1/2007 | Hagemeyer et al. | 423/655 |
| 7,160,534 B2 | 1/2007 | Hagemeyer et al. | 423/655 |
| 7,179,442 B2 | 2/2007 | Hagemeyer et al. | 423/655 |
| 7,270,798 B2 | 9/2007 | Hagemeyer et al. | 423/655 |
| 7,390,358 B2 | 6/2008 | Quesada et al. | 106/799 |
| 7,429,373 B2 | 9/2008 | Pez et al. | 423/652 |
| 7,438,889 B2 | 10/2008 | Pez et al. | 423/652 |
| 7,507,690 B2 | 3/2009 | Krumpelt et al. | 502/302 |
| 7,682,598 B2 | 3/2010 | Hagemeyer et al. | 423/656 |
| 7,687,051 B2 | 3/2010 | Hagemeyer et al. | 423/655 |
| 7,744,849 B2 | 6/2010 | Hagemeyer et al. | 423/656 |
| 7,897,128 B2 | 3/2011 | Quinn et al. | 423/263 |
| 7,968,245 B2 | 6/2011 | Gottmann et al. | 429/479 |
| 8,038,981 B2 | 10/2011 | Garg et al. | 423/650 |
| 8,133,463 B1 | 3/2012 | Berry et al. | 423/418.2 |
| 8,241,600 B1 | 8/2012 | Berry et al. | 423/418.2 |
| 8,278,232 B2 | 10/2012 | Malow et al. | 501/152 |
| 2004/0266615 A1* | 12/2004 | Watson et al. | 502/325 |

FOREIGN PATENT DOCUMENTS

| | | |
|---|---|---|
| WO | WO 00/16900 | 3/2000 |
| WO | WO 2004/040672 | 5/2004 |
| WO | WO 2004/058631 | 7/2004 |

OTHER PUBLICATIONS

S. Barama et al. "Catalytic properties of Rh, Ni, Pd and Ce supported on Al-pillared montmorillonites in dry reforming of methane." Catalysis Today. vol. 141, pp. 385-392. 2009.

Z. Hao et al. "Zr-Laponite pillared clay-based nickel catalysts for methane reforming with carbon dioxide." Applied Catalysis A: General 242 (2003) 275-286.

Z. Jaworska-Galas. "Effect of rare-earth additives on the properties of Pt/γ—Al2O3 catalysts I. Dispersity of platinum in Pt/γ—Al2O3 catalysts modified by rare-earth elements." React. Kinet. Catal. Lett., vol. 19, No. 1-2, 23-26. (1982).

A. Moronta et al. "Nickel Catalysts Supported on MgO/Smectite-Type Nanocomposites for Methane Reforming." Clays and Clay Minerals, vol. 53, No. 6, 622-630, 2005.

S. Weng et al. "Autothermal steam reforming of ethanol over La2Ce2—xRuxO7 (x=0-0.35) catalyst for hydrogen production." Applied Catalysis B: Environmental 134-135 (2013) 359-366.

R. Ramirez-Lopez et al. "Complete catalytic oxidation of methane over Pd/CeO2—Al2O3: The influence of different ceria loading." Catalysis Today 150 (2010) 358-362.

S. Gaur et al. "CO2 Reforming of CH4 over Ru-Substituted Pyrochlore Catalysts: Effects of Temperature and Reactant Feed Ratio." Energy Fuels 2012, 26, 1989-1998.

N. Bespalko et al. "Comparative study of NiLaZr and CoLaZr catalysts for hydrogen production by ethanol steam reforming: Effect of CO2 injection to the gas reactants. Evidence of Rh role as a promoter." Applied Catalysis A: General 407 (2011) 204-210.

S. Gaur et al. "Rh, Ni, and Ca substituted pyrochlore catalysts for dry reforming of methane." Applied Catalysis A: General 403 (2011) 142-151.

H. Jiang et al. "Recent Progresses on Some Coke Resistant Ni-Based Catalysts for Carbon Dioxide Reforming of Methane." Advanced Materials Research vol. 650 (2013) pp. 85-91.

J. Cheng et al. "Catalytic combustion of methane over La2TM0.3Zr1.7O7 d (TM=Mn, Fe, and Co) pyrochlore oxides." Catalysis Communications 10 (2009) 1170-1173.

D. J. Haynes et al. "Catalytic partial oxidation of n-tetradecane using pyrochlores: Effect of Rh and Sr substitution." Catalysis Today 136 (2008) 206-213.

C. S. Wright et al. "Hydrothermal Synthesis of a Cerium(iv) Pyrochlore with Low-Temperature Redox Properties." Angew. Chem. Int. Ed. 2006, 45, 2442-2446.

J. M. Sohn et al. "The catalytic activity and surface characterization of Ln2B2O7 (Ln=Sm, Eu, Gd and Tb; B=Ti or Zr) with pyrochlore structure as novel CH4 combustion catalyst." Catalysis Today 83 (2003) 289-297.

S. Park et al. "Catalytic combustion of methane over rare earth stannate pyrochlore." Catalysis Letters vol. 87, Nos. 3-4, Apr. 2003.

C. Petit et al. "Oxidative Coupling of Methane by Pyrochlore Oxide A B 0 (A=Rare Earth, B=Ti, Zr, Sn). Relation Between C2 Selectivity ANa 8-a Bond Energy." Catalysis Today, 13 (1992) 409-416.

J. R. Rostrup-Nielsen et al. "A review article: Hydrogen and synthesis gas by steam and CO2 reforming." Adv. Catal. 47 (2002) 65-139.

D. Pakhare et al. "Role of metal substitution in lanthanum zirconate pyrochlores (La2Zr2O7) for dry (CO2) reforming of methane (DRM)." Appl Petrochem Res (2012) 2:27-35.

L. Bouna et al. "Physicochemical Study of Photocatalytic Activity of TiO2 Supported Palygorskite Clay Mineral." International Journal of Photoenergy. vol. 2013, pp. 1-6. 2013.

(56) References Cited

OTHER PUBLICATIONS

M.S. Prasad et al. "Kaolin: processing, properties and applications." Applied Clay Science, 6 (1991) 87-119.

B. C. A. Pinheiro et al. "Obtainment of porcelain floor tiles added with petroleum oily sludge." Ceramics International 39 (2013) 57-63.

A. Feriancova et al. "The influence of kaolin filler on thermal and spectral characteristics of rubberizing components without rubber." J. Therm. Anal. Calorim. 2013, vol. 112, Issue 2, pp. 1047-1052.

S. Gaur. "Dry Reforming of Methane on Rhodium and Nickel Substituted Pyrochlore Catalysts." (Master's Thesis) Louisiana State University and Agricultural and Mechanical College. United States.

\* cited by examiner

US 9,409,150 B2

CLAY MINERAL SUPPORTED CATALYSTS

CROSS REFERENCE TO RELATED APPLICATIONS

This application claims the benefit of U.S. Provisional Application No. 61/821,514, filed May 9, 2013. The contents of the referenced application are incorporated into this application by reference.

BACKGROUND OF THE INVENTION

A. Field of the Invention

The invention generally concerns the use of a support material for hydrocarbon gas reforming catalysts. In particular, the support material can include clay minerals.

B. Description of Related Art

Synthesis gas or "syngas" is a gas mixture that includes carbon monoxide and hydrogen. Syngas is typically used as an intermediary gas to produce a wide range of various products, such mixed alcohols, hydrogen, ammonia, i-$C_4$ hydrocarbons, mixed alcohols, Fischer-Tropsch products (e.g., waxes, diesel fuels, olefins, gasoline, etc.) methanol, ethanol, aldehydes, alcohols, etc. Syngas can also be used as a direct fuel source, such as for internal combustible engines.

One of the more common methods of producing syngas is by oxidizing hydrocarbon gases such as methane. For instance, the controlled oxidation of methane can be done using carbon dioxide, water, or oxygen or a combination of such materials. For industrial scale applications, methane can be reformed into syngas by using steam, such as by the following reaction:

$$CH_4 + H_2O \rightarrow CO + 3H_2$$

The ratio of $CO/H_2$ obtained by using this process is approximately 1:3 or 0.33. One of the issues with this ratio is that applications for producing aldehydes, alcohols, and ammonia require a ratio of $CO/H_2$ of about 1:1 or 1. Therefore, the current solution is to remove excess $H_2$ from the produced syngas via separation techniques which can decrease efficient production while simultaneously increasing associated costs. A 1:1 ratio can also be obtained by replacing water with carbon dioxide or a mixture of carbon dioxide and oxygen, such as by the following reactions:

$$CH_4 + CO_2 \rightarrow 2CO + 2H_2$$

$$2CH_4 + CO_2 + O_2 \rightarrow 3CO + 3H_2 + H_2O.$$

Catalysts are used to drive the above reforming reactions. One of the issues with current catalysts is that they are prone to sintering, which can reduce the active surface area of the catalytic material, thereby reducing the efficiency of catalyst. Another issue is that of carbon formation or coking, which can also occur on the catalytic material. The catalysts used in the above methane/carbon dioxide reforming reactions are especially prone to sintering and coking issues, both on the surface of the actual catalyst and the material that is used to support the catalyst.

SUMMARY OF THE INVENTION

It has been discovered that various clay minerals can be used as a support for catalytic materials that are typically used in syngas production. Such clay minerals have been shown to reduce coking and sintering during the reaction process. Further, their durability is superior to those that are currently available on the market.

In one aspect of the present invention, there is disclosed a hydrocarbon gas reforming supported catalyst that can include a catalytic material capable of catalyzing the production of a gaseous mixture comprising hydrogen and carbon monoxide from a hydrocarbon gas, and a clay support material comprising a clay mineral, wherein the catalytic material is attached to the clay support material. The attachment can be through chemical bonds or physical bonds or both. In particular instances, the bonds can be M1-M2 bonds (where M1 is a metal from the catalyst and M2 is a metal from the clay mineral) or M1-O bonds (where M1 is a metal from the catalyst and O is oxygen from the clay mineral). The clay mineral can be a synthetic clay mineral (e.g., produced synthetically rather than obtained from a natural source). Alternatively, the clay mineral can be isolated or purified from a natural source (e.g., unwanted or undesired impurities can be removed, such as those that may induce sintering or coking during syngas production (e.g., iron, nickel, manganese, sodium, potassium, chloride, calcium, lithium, rubidium, berylium, barium, $SiO_2$, and/or organic impurities can be removed). In either instance, the synthetic, purified, or isolated clay mineral can have little to no such impurities to help avoid sintering or coking issues. In another embodiment, however, non-isolated or non-purified clay minerals can be used. Non-limiting examples of clay minerals that can be used in the context of the present invention include kaolin-serpentine clay minerals (e.g., kaolinite, halloysite, lizardite, chrysotile), pyrophyllite-talc clay minerals, mica clay minerals (e.g., illite, glauconite, celadonite), vermiculite clay minerals, smectite clay minerals (montmorillonite, nontronite, saponite), chlorite clay minerals (sudoite, clinochlore, chamosite), sepiolite-palygorskite clay minerals, interstratified clay minerals (e.g., rectorite, corrensite, tosudite), and/or allophane and imogolite clay minerals. Further, any mixture or combination of such minerals can also be used (e.g., kaolin and a smectite, a kaolin and a talc, a kaolin and a chlorite, etc.). In particular instances the clay mineral can be one that has a 1:1 silicate layer or a 2:1 silicate layer. In particular instances, the clay mineral can be a kaolin, such as a kaolinite. In certain aspects, the supported catalyst can include at least 1, 5, 10, 15, 20, 25, 30, 35, 40, 45, 50%, or more by weight of the catalytic material and/or at least 1, 5, 10, 15, 20, 25, 30, 35, 40, 45, 50, 60, 70, 80, 90%, or more by weight of the clay support material. The clay support material can comprise or consist essentially of or consist of the clay mineral. In particular aspects, the supported catalyst comprises 5% to 50% by weight of the catalytic material and 95% to 50% by weight of the clay support material or 10% to 20% by weight of the catalytic material and 90% to 80% by weight of the clay support material. The clay support material and/or the catalysts can be in powdered or particulate form. The size of the particles can vary as needed for small or lab scale applications or for large or industrial scale applications. In one particular instance, the size of the particles can range from 5 to 300 μm. Alternatively, the clay support material or the catalyst can have a fabricated geometry (e.g., a pellet, foam, honeycomb, monolith, etc.). The catalytic material can be dispersed throughout the surface of the support material. In particular instances, the catalyst is capable of reducing carbon formation or coking on the surface of said supported catalyst when subjected to temperatures greater than 700° C., greater than 725° C., 750° C., 775° C., or greater than 800° C. or from a range of greater than 700° C., 725° C., 750° C., 775° C., or 800° C. to 1100° C., or from a range of greater than 700° C., 725° C., 750° C., 775° C., or 800° C. to 1000° C., or from a range of greater than 700° C., 725° C., 750° C., 775° C., or 800° C. to 900° C. In particular instances, the range can be from 800° C. to 1000° C. or from 800° C. to 1100° C. Similarly or alternatively, the supported catalyst is capable of reducing sintering of the catalytic material or of the clay support material when subjected to temperatures greater than 700° C., greater than 725° C., 750° C., 775° C., or greater than 800° C. or from a range of greater than 700° C., 725° C., 750° C., 775° C., or 800° C. to 1100° C., or from a range of greater than 700° C., 725° C., 750° C., 775° C., or 800° C. to 1000° C., or from a range of greater than 700° C., 725° C., 750° C., 775° C., or 800° C. to 900° C. In particular instances, the range can be from 800° C. to 1000° C. or from 800° C. to 1100° C. Therefore, the reaction temperature for syngas production using the catalysts of the present invention can be a range of greater than 700° C. to 1100° C. or a range from 725° C., 750° C., 775° C., or 800° C. to 900° C., 1000° C., or 1100° C. In particular instances, the range can be from 800° C. to 1000° C. or from 800° C. to 1100° C. The catalytic material can be a pyrochlore. A non-limiting example of a pyrochlore is one having the structure of:

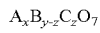

$$A_xB_{y-z}C_zO_7$$

wherein, A is a trivalent ion of an element of La, Ce, Nd, Bi, Sc, or Y, where $0 \leq x \leq 2$, B is a tetravalent ion of an element of Zr, Pt, Pd, Ni, Mo, Rh, Ru, or Ir, where $0 \leq y-z \leq 2$, C is a bivalent, trivalent or tetravalent ion of Ba, Ca, Cu, Mg, Ru, Rh, Pt, Pd, Ni, Co, or Mo, where $0 \leq z \leq 2$. The variables x, y, and z are each numbers (e.g., real numbers). Alternatively, the catalytic material can be a metal catalyst, a metal oxide catalyst, metal oxide supported metal catalysts (e.g., metals such as Pt, Pd, Ir, Ni, Co, Rh, Ru, La, Mg, Ca, Sr, Ba, Fe, Sn, Cu, Zn, supported on various metal oxides such as $Al_2O_3$, $SiO_2$, SBA-15, MCM-40, $TiO_2$, $ZrO_2$, $CeO_2$, etc., or perovskite-type solid solutions). Non-limiting examples of metal catalysts include Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof. Non-limiting examples of metal oxide catalysts include $La_2O_3$, $Ru_2O_3$, $CeO_2$, $ZrO_2$, $ZnO$, $MoO_3$, $WO_3$, $Nb_2O_5$, or $Ta_2O$, or any combination thereof. In particular instances, the metal can be Ni, Pt, Rh, or Ru or any combination thereof. In particular instances, the catalytic material is $La_2Ni_{0.11}Zr_{1.89}O_7$, $La_2Pt_{0.11}Zr_{1.89}O_7$, or $La_2Rh_{0.11}Zr_{1.85}O_7$ and the clay support material can be kaolinite. In still other instances, the catalytic material can be La/Ni or $CeO_2$/Pt and the clay support can be kaolinite. The hydrocarbon gas can be methane. In particular instances, the catalytic material does not include $TiO_2$. In still further instances, the clay support material does not include a perovskite, a fluorite, a weberite, a montmorillonite, a beidellite, a sepiolite, a palygorskite, and/or mica. Similarly, the catalytic materials in certain instances does not include a perovskite, a fluorite, a weberite, a montmorillonite, a beidellite, a sepiolite, a palygorskite, and/or mica. In one instance, the catalyst is not a $TiO_2$ catalyst supported by a palygorskite clay mineral or a beidellite clay mineral or a montmorillonite.

Also disclosed is a composition or dispersion comprising a continuous phase comprising a solvent and a catalytic material capable of catalyzing the production of a gaseous mixture comprising hydrogen and carbon monoxide from a hydrocarbon gas, wherein the catalytic material is solubilized in the solvent and a dispersed phase comprising any one of the clay minerals discussed above and/or throughout this specification. Non-limiting examples of solvents include water, methanol, ethanol, propanol or isopropanol, butanol, or mixtures thereof. The dispersion can also include additional materials, ingredients, and/or additives. Such additional materials, ingredients, additives can be those that stabilize the dispersion, aid in solubility of the catalytic material, help reduce coking or sintering during use of the catalyst, etc. In one instance, the additive is citric acid.

In another embodiment of the invention there is disclosed a method of producing the hydrocarbon gas reforming supported catalyst discussed above and/or throughout this specification. The method can include evaporating the solvent from the above dispersion, thereby resulting in or producing said hydrocarbon gas reforming supported catalyst. The catalytic material is then attached to the synthetic or purified clay mineral.

Also disclosed is a method of producing a gaseous mixture comprising contacting a reactant gas mixture comprising a hydrocarbon and an oxidant with any one of the hydrocarbon gas reforming supported catalysts discussed above and/or throughout this specification under conditions sufficient to produce a gaseous mixture comprising hydrogen and carbon monoxide. Further, there is disclosed a method of catalytically reforming a reactant gas mixture comprising providing a reactant gas mixture comprising a hydrocarbon and an oxidant, providing any one of the hydrocarbon gas reforming supported catalysts discussed above and/or throughout this specification, and contacting the reactant gas mixture with the hydrocarbon gas reforming supported catalyst under conditions sufficient to produce a gaseous mixture comprising carbon monoxide and hydrogen. Such conditions sufficient to produce said gaseous mixture can include a temperature range of 700° C. to 1100° C. or a range from 725° C., 750° C., 775° C., or 800° C. to 900° C., 1000° C., or 1100° C. or from 800° C. to 1000° C. or from 800° C. to 1100° C., a pressure range of from 1 bara to 30 bara, and/or a gas hourly space velocity (GHSV) ranging from 500 to 10000 $h^{-1}$. In particular instances, the hydrocarbon comprises methane. In certain aspects, the oxidant comprises carbon dioxide, oxygen, or water, or any combination thereof. In particular instances, the hydrocarbon comprises methane and the oxidant comprises carbon dioxide or a mixture of carbon dioxide and oxygen, and the ratio of carbon monoxide to hydrogen in the produced gaseous mixture is approximately 1:1 or 1. In other aspects, the hydrocarbon comprises methane and the oxidant comprises water (e.g., water vapor or steam), and the ratio of carbon monoxide to hydrogen in the produced gaseous mixture is approximately 1:3 or 0.33. The reactant gas mixture can include natural gas, liquefied petroleum gas comprising $C_2$-$C_5$ hydrocarbons, $C_6$+ heavy hydrocarbons (e.g., C6 to C24 hydrocarbons such as diesel fuel, jet fuel, gasoline, tars, kerosene, etc.), oxygenated hydrocarbons, and/or biodiesel, alcohols, or dimethyl ether. In particular instances, the reactant gas mixture has an overall oxygen to carbon atomic ratio equal to or greater than 0.9. The method can further include isolating and/or storing the produced gaseous mixture. The method can also include separating hydrogen from the produced gaseous mixture (such as by passing said produced gaseous mixture through a hydrogen selective membrane to produce a hydrogen permeate). The method can include separating carbon monoxide from the produced gaseous mixture (such as by passing said produced gaseous mixture through a carbon monoxide selective membrane to produce a carbon monoxide permeate). In certain aspects, the carbon formation or coking is reduced or does not occur on the supported catalyst and/or sintering is reduced or does not occur on the supported catalyst. In particular instances, carbon formation or coking and/or sintering is reduced or does not occur when said supported catalyst is subjected to temperatures at a range of greater than 700° C. to 1100° C. or a range from 725° C., 750° C., 775° C., or 800° C. to 900° C., 1000° C., or 1100° C. In particular instances, the range can be from 800° C. to 1000° C. or from 800° C. to 1100° C.

Also disclosed are embodiments 1-45 as follows. Embodiment 1 includes a hydrocarbon gas reforming supported catalyst comprising: (a) a catalytic material capable of catalyzing the production of a gaseous mixture comprising hydrogen and carbon monoxide from a hydrocarbon gas; and (b) a clay support material comprising a clay mineral, wherein the catalytic material is attached to the clay support material. Embodiment 2 is the hydrocarbon gas reforming supported catalyst of embodiment 1, wherein the clay mineral comprises a 1:1 silicate layer or 2:1 silicate layer. Embodiment 3 is the hydrocarbon gas reforming supported catalyst of embodiment 2, wherein the clay mineral comprises a 1:1 silicate layer. Embodiment 4 is the hydrocarbon gas reforming supported catalyst of embodiment 3, wherein the clay mineral is a kaolin mineral. Embodiment 5 is the hydrocarbon gas reforming supported catalyst of embodiment 4, wherein the kaolin mineral is kaolinite. Embodiment 6 is the hydrocarbon gas reforming supported catalyst of any one of embodiments 1 to 5, wherein the clay mineral is a purified or isolated clay mineral or a synthetic clay mineral. Embodiment 7 is the hydrocarbon gas reforming supported catalyst of any one of embodiments 1 to 6, wherein the supported catalyst comprises at least 1, 5, 10, 15, 20, 25, 30, 35, 40, 45, 50%, or more by weight of the catalytic material. Embodiment 8 is the hydrocarbon gas reforming supported catalyst of embodiment 7, wherein the supported catalyst comprises at least 1, 5, 10, 15, 20, 25, 30, 35, 40, 45, 50, 60, 70, 80, 90%, or more by weight of the clay support material. Embodiment 9 is the hydrocarbon gas reforming supported catalyst of embodiment 8, wherein the supported catalyst comprises 5% to 50% by weight of the catalytic material and 95% to 50% by weight of the clay support material or 10% to 20% by weight of the catalytic material and 90% to 80% by weight of the clay support material. Embodiment 10 is the hydrocarbon gas reforming supported catalyst of any one of embodiments 1 to 9, wherein the clay support material is in particulate or powdered form and wherein the catalytic material is attached to the surface of the clay support material. Embodiment 11 is the hydrocarbon gas reforming supported catalyst of embodiment 10, wherein the particle size of the clay support material ranges from 5 to 300 µm. Embodiment 12 is the hydrocarbon gas reforming supported catalyst of any one of embodiments 1 to 11, wherein the clay support material is in non-powdered form or has a fabricated geometry and wherein the catalytic material is attached to the surface of the clay support material. Embodiment 13 is the hydrocarbon gas reforming supported catalyst of embodiment 12, wherein the fabricated geometry is a pellet, foam, honeycomb, or monolith. Embodiment 14 is the hydrocarbon gas reforming supported catalyst of any one of embodiments 1 to 13, wherein the catalytic material is dispersed on the surface of the clay support material. Embodiment 15 is the hydrocarbon gas reforming supported catalyst of any one of embodiments 1 to 14, wherein the supported catalyst is capable of reducing carbon formation on the surface of said supported catalyst when subjected to temperatures at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C. Embodiment 16 is the hydrocarbon gas reforming supported catalyst of any one of embodiments 1 to 15, wherein the supported catalyst is capable of reducing sintering of the catalytic material or of the clay support material when subjected to temperatures at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C. Embodiment 17 is the hydrocarbon gas reforming supported catalyst of any one of embodiments 1 to 16, wherein the catalytic material comprises a pyrochlore of: $A_xB_{y-z}C_zO_7$, wherein, A is a trivalent ion of an element of La, Ce, Nd, Bi, Sc, or Y, where $0 \le x \le 2$, B is a tetravalent ion of an element of Zr, Pt, Pd, Ni, Mo, Rh, Ru, or Ir, where $0 \le y-z \le 2$, C is a bivalent, trivalent or tetravalent ion of Ba, Ca, Cu, Mg, Ru, Rh, Pt, Pd, Ni, Co, or Mo, where $0 \le z \le 2$. Embodiment 18 is the hydrocarbon gas reforming supported catalyst of any one of embodiments 1 to 16, wherein the catalytic material is a metal catalyst or a metal oxide catalyst. Embodiment 19 is the hydrocarbon gas reforming supported catalyst of embodiment 18, wherein the metal catalyst or metal oxide catalyst comprises Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof. Embodiment 20 is the hydrocarbon gas reforming supported catalyst of embodiment 19, wherein the metal catalyst comprises Ni, Pt, Rh, or Ru or any combination thereof. Embodiment 21 is the hydrocarbon gas reforming supported catalyst of embodiment 1, wherein the catalytic material comprises $La_2Ni_{0.11}Zr_{1.89}O_7$ or $La_2Rh_{0.11}Zr_{1.85}O_7$ and the clay support material comprises kaolinite. Embodiment 22 is the hydrocarbon gas reforming supported catalyst of any one of embodiments 1 to 21, wherein the hydrocarbon gas is methane. Embodiment 23 concerns a composition comprising: (a) a continuous phase comprising a solvent and a catalytic material capable of catalyzing the production of a gaseous mixture comprising hydrogen and carbon monoxide from a hydrocarbon gas, wherein the catalytic material is solubilized in the solvent; and (b) a dispersed phase comprising a clay mineral in powdered or particulate form. Embodiment 24 is the composition of embodiment 23, wherein the solvent is water, methanol, ethanol, propanol or isopropanol, butanol, or mixtures thereof. Embodiment 25 is a method of producing the hydrocarbon gas reforming supported catalyst of any one of embodiments 1 to 22 comprising obtaining the composition of any one of embodiments 23 to 24, and evaporating the solvent from said composition, wherein the hydrocarbon gas reforming supported catalyst is produced, and wherein the catalytic material is attached to the clay mineral. Embodiment 26 is a method of producing a gaseous mixture comprising contacting a reactant gas mixture comprising a hydrocarbon and an oxidant with the hydrocarbon gas reforming supported catalyst of any one of embodiments 1 to 22 under conditions sufficient to produce a gaseous mixture comprising hydrogen and carbon monoxide. Embodiment 27 concerns a method of catalytically reforming a reactant gas mixture comprising: (a) providing a reactant gas mixture comprising a hydrocarbon and an oxidant; (b) providing the hydrocarbon gas reforming supported catalyst of any one of embodiments 1 to 22; and (c) contacting the reactant gas mixture with the hydrocarbon gas reforming supported catalyst under conditions sufficient to produce a gaseous mixture comprising carbon monoxide and hydrogen. Embodiment 28 is the method of any one of embodiments 26 to 27, wherein the hydrocarbon comprises methane. Embodiment 29 is the method of any one of embodiments 26 to 27, wherein the oxidant comprises carbon dioxide, oxygen, or water, or any combination thereof. Embodiment 30 is the method of embodiment 29, wherein the hydrocarbon comprises methane and the oxidant comprises carbon dioxide or a mixture of carbon dioxide and oxygen. Embodiment 31 is the method of embodiment 30, wherein the ratio of carbon monoxide to hydrogen in the produced gaseous mixture is approximately 1. Embodiment 32 is the method of embodiment 30, wherein the hydrocarbon comprises methane and the oxidant comprises water. Embodiment 33 is the method of embodiment 32, wherein the water is water vapor. Embodiment 34 is the method of any one of embodiments 32 to 33, wherein the ratio of carbon monoxide to hydrogen in the produced gaseous mixture is approximately 0.33. Embodiment 35 is the method of any one of embodiments 26 to 27, wherein the reactant gas mixture comprises natural gas. Embodiment 36 is the method of any one of embodiments 26 to 27, wherein the reactant gas mixture comprises liquefied petroleum gas comprising $C_2$-$C_5$ hydrocarbons. Embodiment 37 is the method of any one of embodiments 26 to 27, wherein the reactant gas mixture comprises $C_6+$ heavy hydrocarbons. Embodiment 38 is the method of embodiment 37, wherein the $C_6+$ heavy hydrocarbons comprise diesel fuel, jet fuel, gasoline, tars, or kerosene. Embodiment 39 is the method of any one of embodiments 26 to 27, wherein the reactant gas mixture comprises oxygenated hydrocarbons. Embodiment 40 is the method of embodiment 39, wherein the oxygenated hydrocarbons comprise biodiesel, alcohols, or dimethyl ether. Embodiment 41 is the method of any one of embodiments 26 to 40, wherein the reactant gas mixture has an overall oxygen to carbon atomic ratio equal to or greater than 0.9. Embodiment 42 is the method of any one of embodiments 26 to 41, further comprising contacting the reactant gas mixture with the hydrocarbon gas reforming supported catalyst at a temperature ranging from 700° C. to 1100° C. or a range from 725° C., 750° C., 775° C., or 800° C. to 900° C., 1000° C., or 1100° C., at a pressure ranging from 1 bara to 30 bara, and/or at a gas hourly space velocity (GHSV) ranging from 500 to 10000 $h^{-1}$. Embodiment 43 is the method of any one of embodiments 26 to 42, wherein carbon formation is reduced or does not occur on the supported catalyst. Embodiment 44 is the method of any one of embodiments 26 to 43, wherein sintering is reduced or does not occur on the supported catalyst. Embodiment 45 is the method of any one of embodiments 43 to 44, wherein carbon formation and/or sintering is reduced or does not occur when said supported catalyst is subjected to temperatures greater than 700° C. to 1100° C. or a range from 725° C., 750° C., 775° C., or 800° C. to 900° C., 1000° C., or 1100° C.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The catalysts of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the catalysts of the present invention are their ability to reduce sintering and coking on the catalytic material and/or on the clay support material.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

The currently available catalysts used to reform hydrocarbons into syngas are prone to coking and sintering, both of which can lead to inefficient catalyst performance and ultimately failure of the catalyst after relatively short periods of use. This can lead to inefficient syngas production as well increased costs associated with its production.

A discovery has been made that avoids the coking and sintering issues described above. The discovery is based on the use of clay minerals as a support for the catalytic material. Without wishing to be bound by theory, it is believed that clay minerals such as kaolinite have increased oxygen mobility characteristics when compared with currently used support materials. In particular, certain clay minerals have chemical and structural characteristics that are believed to provide for an environment that has both high oxygen exchange capacity and mobility characteristics, thereby reducing the incidence of coking and sintering when the catalysts of the present invention are used to produce syngas.

These and other non-limiting aspects of the present invention are discussed in further detail in the following sections.

A. Clay Minerals

There are a variety of clay minerals that can be used as support materials in the context of the present invention. Non-limiting examples of such materials are provided below. In particular aspects, however, clay minerals having a 1:1 silicate layer structural format are used (e.g., kaolinite), which are shown in the examples as having zero coking at temperatures above 800° C. when used as a support.

Typically, a clay mineral includes silica, alumina or magnesia or both, and water. Some clay minerals may be expressed using ideal chemical formulas as the following: $2SiO_2 \cdot Al_2O_3 \cdot 2H_2O$ (kaolinite), $4SiO_2 \cdot Al_2O_3 \cdot H_2O$ (pyrophyllite), $4SiO_2 \cdot 3MgO \cdot H_2O$ (talc), and $3SiO_2 \cdot Al_2O_3 \cdot 5FeO \cdot 4H_2O$ (chamosite). The $SiO_2$ ratio is a key factor for determining clay mineral types. Clay minerals can be classified on the basis of variations of chemical composition and atomic structure into nine groups: (1) kaolin-serpentine (kaolinite, halloysite, lizardite, chrysotile), (2) pyrophyllite-talc, (3) mica (illite, glauconite, celadonite), (4) vermiculite, (5) smectite (montmorillonite, nontronite, saponite), (6) chlorite (sudoite, clinochlore, chamosite), (7) sepiolite-palygorskite, (8) interstratified clay minerals (e.g., rectorite, corrensite, tosudite), and (9) allophane-imogolite.

Figure 1:
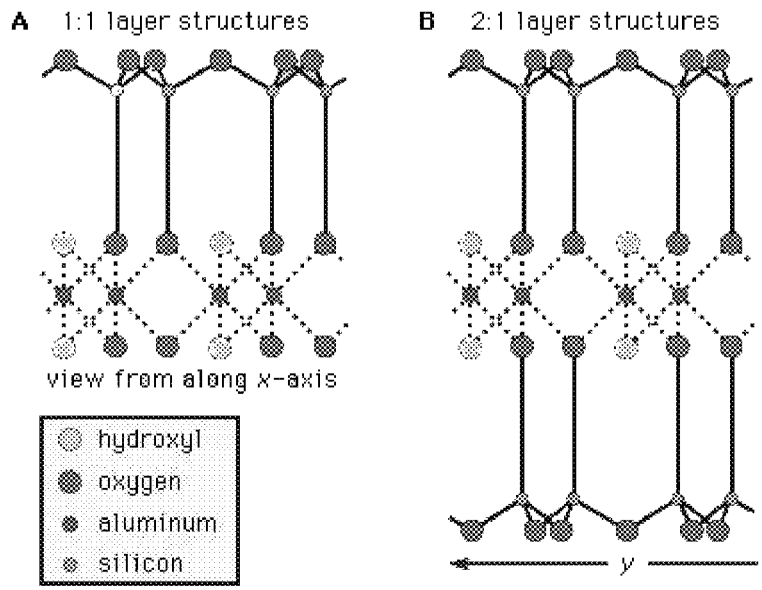
FIG. 1: Illustration of 1:1 and 2:1 silicate layers present in various clay minerals.

The prevalent structural feature of clay minerals is the presence of hydrous-layer silicates. These features are continuous two-dimensional tetrahedral sheets of $Si_2O_5$, with $SiO_4$ tetrahedrons linked by the sharing of three corners of each tetrahedron to form a hexagonal mesh pattern. The apical oxygen at the fourth corner of the tetrahedrons, which is usually directed normal to the sheet, forms part of an adjacent octahedral sheet in which octahedrons are linked by sharing edges. There are two major types for the structural "backbones" of clay minerals called silicate layers. The unit silicate layer formed by aligning one octahedral sheet to one tetrahedral sheet is referred to as a 1:1 silicate layer, and the exposed surface of the octahedral sheet consists of hydroxyls. In another type, the unit silicate layer consists of one octahedral sheet sandwiched by two tetrahedral sheets that are oriented in opposite directions and is termed a 2:1 silicate layer. Therefore, a clay mineral comprising a 1:1 silicate layer is one in which an octahedral sheep is aligned with a tetrahedral sheet. By comparison, a clay mineral comprising a 2:1 silicate layer is one in which an octahedral sheet is aligned with a tetrahedral sheet on one side and a second tetrahedral sheet on the opposing side. FIG. 1 provides an illustration of 1:1 and 2:1 silicate layers.

Kaolin-serpentine groups of clay minerals are 1:1 layer silicates. Their basic unit of structure includes tetrahedral and octahedral sheets in which the anions at the exposed surface of the octahedral sheet are hydroxyls. Therefore, their general structure can be expressed as: $Y_{2-3}Z_2O_5(OH)_4$, where Y are cations in the octahedral sheet such as $Al^{3+}$ and $Fe^{3+}$ for dioctahedral species and $Mg^{2+}$, $Fe^{2+}$, $Mn^{2+}$, and $Ni^{2+}$ for trioctahedral species, and Z are cations in the tetrahedral sheet, largely Si and, to a lesser extent, Al and $Fe^{3+}$. Kaolinite has a structural formula of $Al_2Si_2O_5(OH)_4$. Kaolinite is electrostatically neutral and has triclinic symmetry. Dickite and nacrite are polytypic varieties of kaolinite, both of which include a double 1:1 layer and have monoclinic symmetry, but have different stacking sequences of the two 1:1 silicate layers. Halloysite also has a composition close to that of kaolinite and is characterized by its tubular nature in contrast to the platy nature of kaolinite particles. Halloysite has a hydrated form with a composition of $Al_2Si_2O_5(OH)_4 \cdot 2H_2O$. This hydrated form irreversibly changes to a dehydrated variety at relatively low temperatures (60° C.) or upon being exposed to conditions of low relative humidity. Trioctahedral magnesium species, chrysotile, antigorite, and lizardite, have a formula of $Mg_3Si_2O_5(OH)_4$. Chrysotile crystals have a cylindrical roll morphology. Antigorite crystals exhibit an alternating wave structure. Lizardite crystals are platy and can include a small amount of substitution of aluminum or ferric iron for both silicon and magnesium.

With respect to the pyrophyllite-talc group of clay minerals, they have a 2:1 layer form with a unit thickness of approximately 9.2 to 9.6 Å. The structure is an octahedral sheet sandwiched by two tetrahedral sheets. Pyrophyllite and talc represent the dioctahedral and trioctahedral members, respectively, of the group. The structural formulas are $Al_2Si_4O_{10}(OH)_2$ for pyrophyllite and $Mg_3Si_4O_{10}(OH)_2$ for talc. Therefore, the 2:1 layers of these minerals are electrostatically neutral and are held together with van der Waals bonding.

Mica clay minerals also have a basic structural unit of the 2:1 layer type like pyrophyllite and talc. Examples include muscovite $(KAl_2(Si_3Al)O_{10}(OH)_2)$, phlogopite $(KMg_3(Si_3Al)O_{10}(OH)_2)$, biotite $(K(Mg, Fe)_3(Si_3Al)O_{10}(OH)_2)$, celadonite $(K(Mg, Fe_{3+})(Si_{4-x}Al_x)O_{10}(OH)_2$, where x=0-0.2), and Glauconite.

The vermiculite clay mineral includes sheets of trioctahedral mica or talc separated by layers of water molecules.

Smectite clay minerals are derived from the structures of pyrophyllite and talc. Unlike pyrophyllite and talc, the 2:1 silicate layers of smectite have a slight negative charge due to ionic substitutions in the octahedral and tetrahedral sheets. The structural formula of smectites include $(Al_{2-y}Mg^{2+}/_y)(Si_{4-x}Al_x)O_{10}(OH)_2M^+/_{x+y} \cdot nH_2O$, where $M^+$ is the interlayer exchangeable cation expressed as a monovalent cation and where x and y are the amounts of tetrahedral and octahedral substitutions, respectively ($0.2 \leq x+y \leq 0.6$). The smectites with y>x are called montmorillonite and those with x>y are known as beidellite. Nontronites are those in which ferric iron is a dominant cation in the octahedral sheet instead of aluminum and magnesium. Beidellites are those where chromium ($Cr^{3+}$) and vanadium ($V^{3+}$) also are found as dominant cations in the octahedral sheets. Trioctahedral ferromagnesian smectites have the following formula $(Mg, Fe^{2+})_3(Si_{4-x}Al_x)O_{10}(OH)_2 M^+/x \cdot nH_2O$.

Chlorite clay minerals include: clinochlore $(Mg_5Al)(Si_3Al)O_{10}(OH)_8$; chamosite $(Fe_5^{2+}Al)(Si_3Al)O_{10}(OH)_8$; pennantite $(Mn_5Al)(Si_3Al)O_{10}(OH)_8$; and (nimite) $(Ni_5Al)(Si_3Al)O_{10}(OH)_8$.

Sepiolite and palygorskite are papyrus-like or fibrous hydrated magnesium silicate minerals. They include two-dimensional tetrahedral sheet of composition $Si_2O_5$ and are regarded as having narrow strips or ribbons of 2:1 layers that are linked stepwise at the corners. The structure of sepiolite is $Mg_8Si_{12}O_{30}(OH)_4(OH_2)_4(H_2O)_8$, and the structure of palygorskite is and $(Mg, Al)_5Si_8O_{20}(OH)_2(OH_2)_4(H_2O)_4$.

Interstratified clay minerals include mixtures of various clay minerals. Examples include rectorite (dioctahedral mica/montmorillonite), tosudite (dioctahedral chlorite/smectite), corrensite (trioctahedral vermiculite/chlorite), hydrobiotite (trioctahedral mica/vermiculite), aliettite (talc/saponite), and kulkeite (talc/chlorite). Other examples include illite/smectite, glauconite/smectite, dioctahedral mica/chlorite, dioctahedral mica/vermiculite, and kaolinite/smectite.

Imogolite clay mineral is an aluminosilicate with an approximate composition of $SiO_2 \cdot Al_2O_3 \cdot 2.5H_2O$. Allophane is a hydrous aluminosilicate mineral dominated by Si—O—Al bonds—i.e., the majority of aluminum atoms are tetrahedrally coordinated. Unlike imogolite, the morphology of allophane varies from fine, rounded particles through ring-shaped particles to irregular aggregates.

Any of the above noted clay minerals can be used in the context of the present invention. Further, while it is contemplated that natural/non-purified or non-isolated or non-synthetic forms can be used, in certain aspects, the clay minerals can be isolated or purified or synthetically produced. One of the reasons for using isolated or purified or synthetically produced clay minerals is to reduce or remove impurities that may cause or lead to sintering of the minerals or coking on the surface of the minerals when used as a support for a catalyst in reforming reactions. Such impurities that may induce sintering or coking during syngas production include iron, nickel, manganese, sodium, potassium, chloride, calcium, lithium, rubidium, berylium, barium, $SiO_2$, and/or organic impurities. By way of example, when clay minerals are heated at elevated temperatures such as those used in carbon dioxide reforming of hydrocarbons to produce syngas, such impurities (e.g., iron or potassium) within the clay mineral could fuse together. Removal or reducing the amounts of such impurities can therefore help reduce or avoid sintering and/or coking.

B. Catalytic Materials

It is contemplated that any of the known catalytic materials that are currently used in producing syngas from hydrocarbons can be used in the context of the present invention. Such catalytic materials can be supported by the clay minerals discussed above and throughout this specification, thereby resulting in a hydrocarbon gas reforming clay mineral supported catalyst of the present invention. Non-limiting examples of such catalysts can include metal catalysts (e.g., Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof), metal oxide catalysts (e.g., $La_2O_3$, $Ru_2O_3$, $CeO_2$, $ZrO_2$, ZnO, $MoO_3$, $WO_3$, $Nb_2O_5$, and/or $Ta_2O$), pyrochlore catalysts, and other known catalysts used in the production of syngas from hydrocarbons (e.g., perovskites type solid solutions, various metals like Pt, Pd, Ir, Ni, Co, Rh, Ru, La, Mg, Ca, Sr, Ba, Fe, Sn, Cu, or Zn supported on various metal oxides such as $Al_2O_3$, $SiO_2$, SBA-15, MCM-40, $TiO_2$, $ZrO_2$, $CeO_2$, etc.). Non-limiting examples of pyrochlore catalysts include those having the following structure:

wherein, A is a trivalent ion of an element of La, Ce, Nd, Bi, Sc, or Y, where $0<x<2$, B is a tetravalent ion of an element of Zr, Pt, Pd, Ni, Mo, Rh, Ru, or Ir, where $0<y-z<2$, C is a bivalent, trivalent or tetravalent ion of Ba, Ca, Cu, Mg, Ru, Rh, Pt, Pd, Ni, Co, or Mo, where $0<z<2$.

C. Methods of Making and Using the Clay Mineral Supported Catalysts

The clay mineral supported catalysts of the present invention can be made by processes known in the art that provide attachment of the catalytic material to the surface of the clay mineral. The attachment can be through chemical bonds or physical bonds or both. In particular instances, the bonds can be M1-M2 bonds (where M1 is a metal from the catalyst and M2 is a metal from the clay mineral) or M1-O bonds (where M1 is a metal from the catalyst and O is oxygen from the clay mineral).

In addition to known methods, it has been discovered that the following process could be used to prepare the clay mineral supported catalysts of the present invention:

1. Preparation of a Dispersion:
    (a) obtain a solution that includes a solvent (e.g., any solvent that can solubilize the catalytic material—non-limiting examples include water, methanol, ethanol, propanol, isopropanol, butanol, or mixtures thereof) and a catalytic material dissolved in said solvent.
    (b) obtain a clay mineral, such as one described above. It can be in particulate or powdered form.
    (c) mix the clay mineral with the solvent to create a dispersion, where the continuous phase includes the solution and the discontinuous/dispersed phase includes the clay mineral. Mixing can occur for a period of time to create the dispersion and to contact the clay mineral with the catalytic material. In one non-limiting aspect, the mixing time can occur for 5, 10, 15, 20, 25, 30, 40, 50, 60, or more minutes. In particular instances, the mixing can occur for about 10 to about 20 minutes or about 15 minutes. Any type of mixing apparatus can be used.
    (d) optionally, additional materials or ingredients or other clay minerals can be added to stabilize the dispersion, modify the resulting catalyst or clay mineral, etc. For instance, a chelating agent (e.g., citric acid, EDTA, disodium EDTA, trisodium EDTA, EGTA, phosphoric acid, succinic acid, etc.) can be added to keep the metal ions apart during the initial stages of synthesis, which leads to the formation of smaller particles in catalysts. Smaller particles can result in higher surface area and pore volume which can have a positive effect on the activity of the catalysts of the present invention.

2. Processing of the Dispersion to Create a Catalyst:
    (a) subject the dispersion to a drying step such that the solvent is removed. An evaporation apparatus such as a rotary evaporator can be used. The resulting sample is dried and in powdered or particulate form.
    (b) the sample from (a) can then be subjected to a calcination step. Such a step can include placing the sample in a ceramic crucible and subjecting it to heat (e.g., from a muffle furnace). The sample can first be subjected to a temperature of 150° C. for 2 hours followed by 900° C. for 8 hours, with the temperature increasing at a rate of 10° C./min.

The obtained material can then be used as a catalyst to produce syngas. As confirmed in the Examples section, no coking or sintering is observed when the catalyst is used at temperatures of at least 800° C., whereas coking is observed at temperatures of 700° C. Therefore, the reaction temperature for syngas production using the catalysts of the present invention can be a range of greater than 700° C. to 1100° C. or a range from 725° C., 750° C., 775° C., or 800° C. to 900° C., 1000° C., or 1100° C. In particular instances, the range can be from 800° C. to 1000° C. or from 800° C. to 1100° C. In addition to temperature, a pressure range from 1 bara to 30 bara, and/or at a gas hourly space velocity (GHSV) range from 500 to 10000 $h^{-1}$ can be used as the reaction conditions for producing syngas from a hydrocarbon material and the catalysts of the present invention.

A benefit of this process of making and using the catalyst is its simplicity and ease of scalability for industrial/large scale applications.

The carbon dioxide in the gaseous feed mixture used in the process of the invention can be obtained from various sources. In one non-limiting instance, the carbon dioxide can be obtained from a waste or recycle gas stream (e.g. from a plant on the same site, like for example from ammonia synthesis) or after recovering the carbon dioxide from a gas stream. A benefit of recycling such carbon dioxide as starting material in the process of the invention is that it can reduce the amount of carbon dioxide emitted to the atmosphere (e.g., from a chemical production site). The hydrogen in the feed may also originate from various sources, including streams coming from other chemical processes, like ethane cracking, methanol synthesis, or conversion of methane to aromatics. The gaseous feed mixture comprising carbon dioxide and hydrogen used in the process of the invention may further contain other gases, provided that these do not negatively affect the reaction. Examples of such other gases include steam or oxygen. The hydrocarbon material used in the reaction can be methane.

Figure 2:
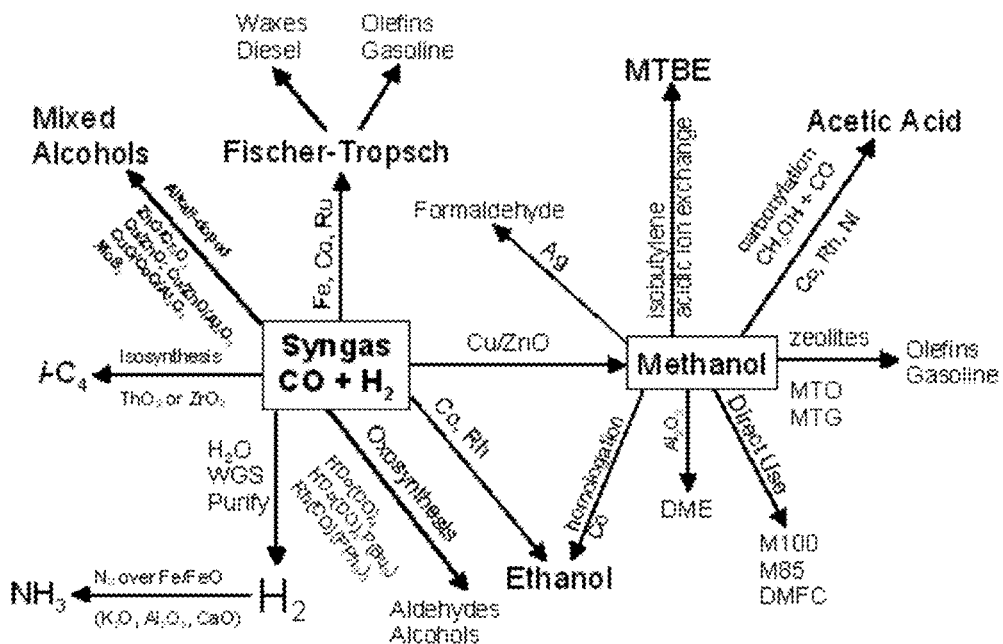
FIG. 2: Illustration of various products that can be produced from syngas.

The resulting syngas can then be used in additional downstream reaction schemes to create additional products. FIG. 2 is an illustration of various products that can be produced from syngas. Such examples include chemical products such as methanol production, olefin synthesis (e.g., via Fischer-Tropsch reaction), aromatics production, carbonylation of methanol, carbonylation of olefins, the reduction of iron oxide in steel production, etc.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of Clay Supported Catalysts

Figure 3:
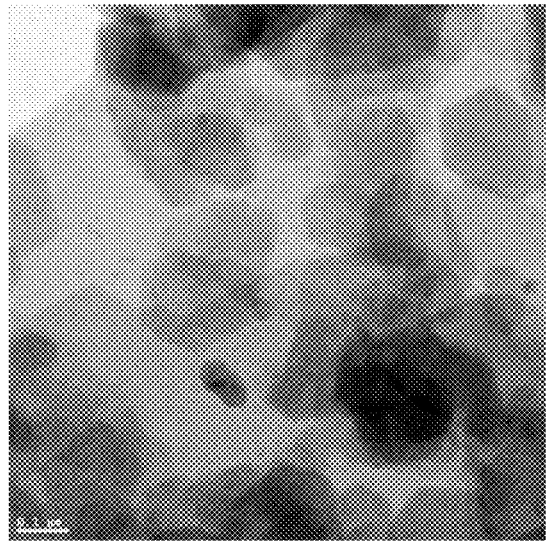
FIG. 3: Transmission electron micrograph of neat Kaolin calcined at 1000° C. for 8 hours.
Figure 4:
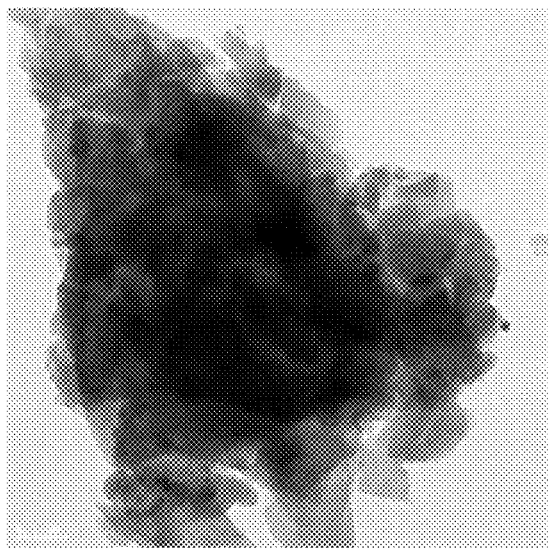
FIG. 4: Transmission electron micrograph of neat 10 wt % $La_2Ni_{0.11}Zr_{1.89}O_7$/Kaolin catalyst calcined at 1000° C. for 8 hours.
Figure 5:
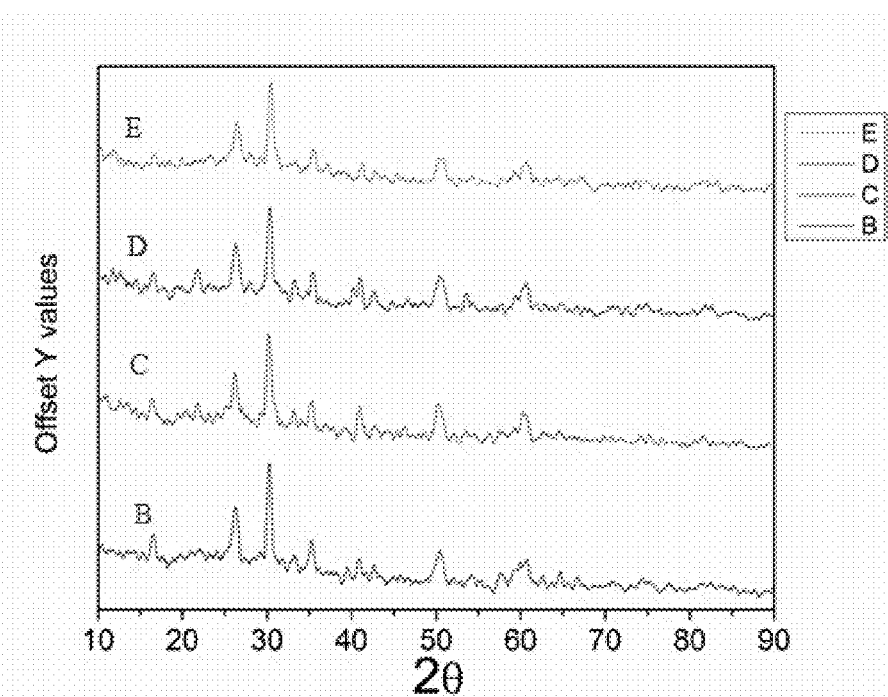
FIG. 5: Powder X-ray diffraction patterns of pyrochlore/kaolin catalysts (B) 20 wt % $La_2Ru_{0.11}Zr_{1.89}O_7$/kaolin, (C) $La_2Rh_{0.11}Zr_{1.89}O_7$/kaolin, (D) $La_2Pd_{0.11}Zr_{1.89}O_7$/kaolin and (E) $La_2Ni_{0.11}Zr_{1.89}O_7$/kaolin.

The following procedure was used to synthesize 10 wt % and 20 wt % of $La_2Ni_{0.11}Zr_{1.89}O_7$ pyrochlore catalysts grafted on Kaolin support: 0.8 g of La $(NO_3)_3.6H_2O$, 0.4 g of $ZrCl_4$, 0.02 g of $NiCl_2.6H_2O$ was dissolved in 7.5 ml of de-ionized water to form a clear solution. 0.4 g of citric acid was added to the above solution. To this 5.1 g of purified kaolin powder (linear formula $Al_2Si_2O_5(OH)_4$) (obtained from Sigma-Aldrich®—K7375) was added and transferred the flask to the Rota evaporator. The material was allowed to mix in the Rota evaporator for 15 minutes and then evaporated the solvent under vacuum until the sample got dried completely. FIG. 3 is a transmission electron micrograph of neat Kaolin calcined at 1000° C. for 8 hours. FIG. 4 is a transmission electron micrograph of neat 10 wt % $La_2Ni_{0.11}Zr_{1.89}O_7$/Kaolin catalyst calcined at 1000° C. for eight hours. For the 20 wt % catalyst, the quantities of metal precursors were doubled. It is contemplated that various wt % can be used in the context of the present invention, such as about 5%, 10%, 15%, 20%, 25%, 50% or more. Further, the kaolin powder can be substituted for another clay mineral, and the pyrochlore catalysts can be varied by varying the starting materials. Using this procedure, the following additional kaolin supported pyrochlore catalysts were also prepared: 10 wt % $La_2Pt_{0.11}Zr_{1.89}O_7$/kaolin; 20 wt % $La_2Ru_{0.11}Zr_{1.89}O_7$/kaolin; 20 wt % $La_2Rh_{0.11}Zr_{1.89}O_7$/kaolin; and 20 wt % $La_2Pd_{0.11}Zr_{1.89}O_7$/kaolin. FIG. 5 includes powder X-ray diffraction patterns of pyrochlore/kaolin catalysts (B) 20 wt % $La_2Ru_{0.11}Zr_{1.89}O_7$/kaolin, (C) 20 wt % $La_2Rh_{0.11}Zr_{1.89}O_7$/kaolin, (D) 20 wt % $La_2Pd_{0.89}O_7$/kaolin and (E) 20 wt % $La_2Ni_{0.11}Zr_{1.89}O_7$/kaolin.

The following two-step procedure was used to synthesize a 10 wt % $CeO_2$/2 wt % Pt catalyst grafted on Kaolin support. In the first step 0.17 g of tetrammine platinum chloride hydrate salt was dissolved in pore volume equivalent of water and impregnated with dried 4.9 g of Kaolin. The resultant product was first dried at 125° C. for 2 h followed by calcination at 200° C. for 4 h. In a second step, a required amount of 0.5 g of cerium ammonium nitrate salt was dissolved in pore volume equivalent of water and impregnated with Pt/Kaolin sample. The resultant mixture was first dried at 150° C. for 2 h followed by calcination at 900° C. for 8 h. Different weight percentages and catalysts can be obtained by adjusting the amount of and types of ingredients as desired.

The following procedure was used to synthesize a La, Ni catalyst grafted on Kaolin support: 2.95 g of La $(NO_3)_3.6H_2O$ and 1.62 g of $NiCl_2.6H_2O$ was dissolved in 7.5 ml of de-ionized water to form a clear solution. 1.57 g of citric acid was added to the above solution. To this 4.52 g of Kaolin powder was added and transferred the flask to the Rota evaporator. The material was allowed to mix in the Rota evaporator for 15 minutes and then evaporated the solvent under vacuum until the sample got dried completely.

Table 1 provides a summary of some of the produced kaolin supported catalysts:

TABLE 1

| Kaolin Supported Catalyst | Solvent Used | Surface Area $(m^2/g)$ |
|---|---|---|
| 10% $La_2Ni_{0.11}Zr_{1.89}O_7$ | water | 16.3 |
| 20% $La_2Ni_{0.11}Zr_{1.89}O_7$ | water | 8.8 |
| 10% $La_2Pt_{0.11}Zr_{1.89}O_7$ | water | 18.2 |
| 10% $CeO_2$/2 wt % Pt/Kaolin | water | 15.0 |
| La, Ni/Kaolin | water | 14.8 |

Example 2

Use of Clay Supported Catalysts

CDRM reactions with 10 wt % $CeO_2$/2 wt % Pt/Kaolin, 10 wt % $La_2Ni_{0.11}Zr_{1.89}O_7$/Kaolin and 10 wt % $La_2Pt_{0.11}Zr_{1.89}O_7$/Kaolin were performed at 800° C. and 1 bara, 800° C. and 1 bara, and 915° C. and 1 bara, respectively, for 20 hours. Prior to the reactions, each of the catalysts were first reduced in 10% $H_2$ atmosphere at 900° C. for 4 h. Subsequently, the CDRM reactions were each initiated by changing the gas mixture to 10% $CH_4$+10% $CO_2$+80% $N_2$. Both GC and Mass spectrometer were used to monitor gas composition. The 200-500 mesh size catalyst powder was used for testing, and the GHSV applied was 5000 $h^{-1}$. Comparative CDRM reactions for each of the catalysts were also performed at the same pressure (1 bara) but at a temperature of 700° C. and coking and catalyst deactivation occurred at this temperature.

Figure 6:
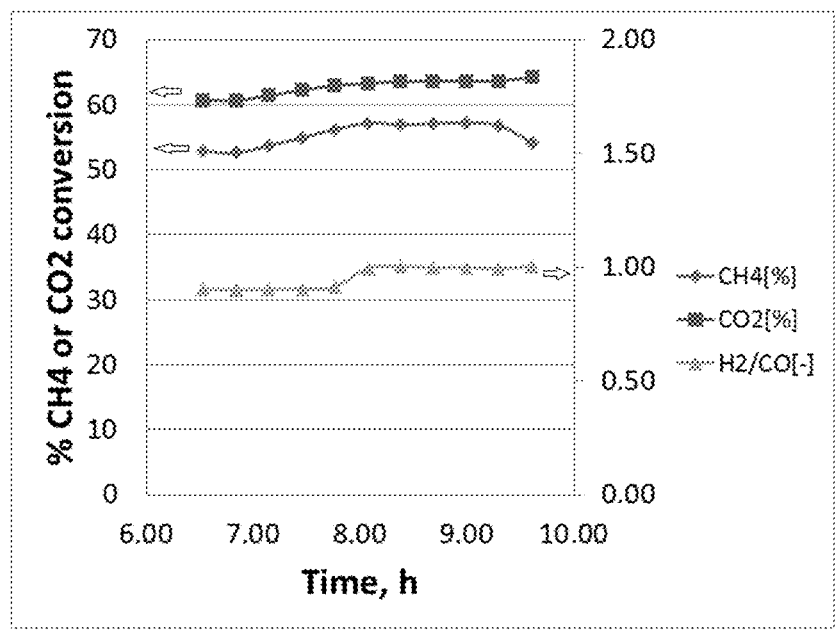
FIG. 6: Carbon dioxide reforming of methane (CDRM) with 10 wt % $CeO_2$/2 wt % Pt/Kaolin catalysts at 800° C. and 1 bara.
Figure 7:
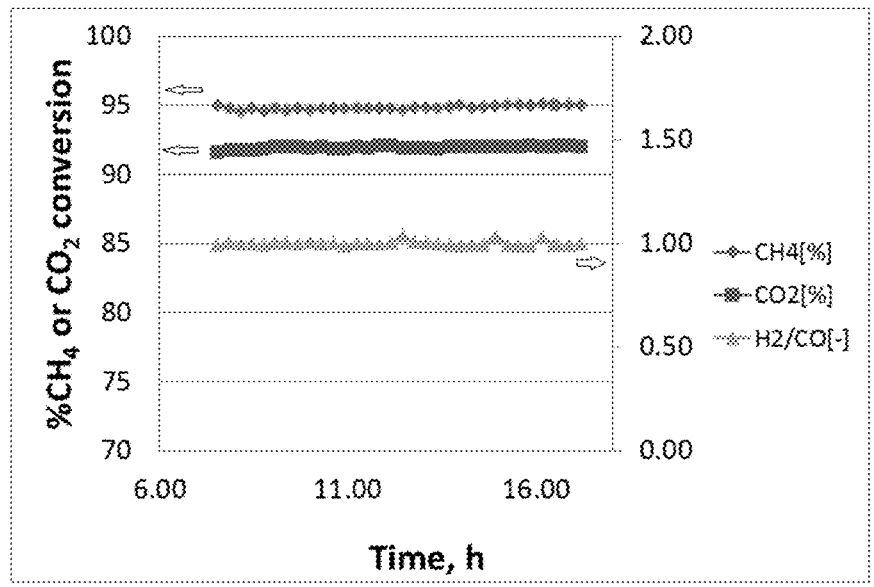
FIG. 7: CDRM with 10 wt % $La_2Ni_{0.11}Zr_{1.89}O_7$/Kaolin catalysts at 800° C. and 1 bara.
Figure 8:
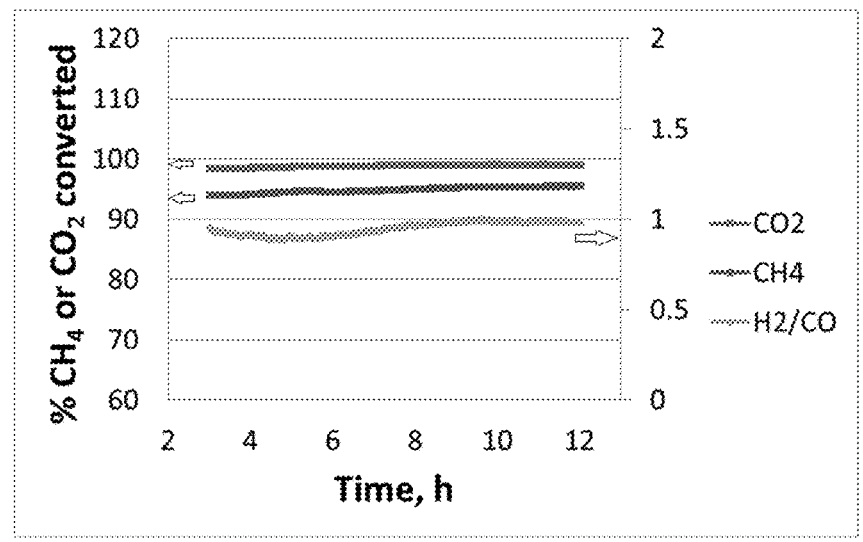
FIG. 8: CDRM with 10 wt % $La_2Pt_{0.11}Zr_{1.89}O_7$/Kaolin catalysts at 915° C. and 1 bara.

The $CO/H_2$ ratio obtained from the reactions was about 1:1 (see FIGS. 6-8). Further, each of the catalysts were found to be stable without any deactivation for 20 h of duration. Notably, coke formation was not observed (no appearance of dark black color on catalysts) in any of these catalysts at temperatures above 800° C. This was confirmed by performing a loss on ignition test of the used catalysts in an open atmosphere at 800° C. By comparison, coke formation was observed (catalyst turned dark black in color) at a temperature of 700° C. Further, no sintering was observed.

Therefore, a critical reaction temperature range to prevent coke formation for the catalysis of the present invention has been discovered.

Example 3

Additional Catalysts

Two additional clay supported catalysts, 20% La6.5% Ni/Kaolin and 20% $La_2Rh_{0.11}Zr_{1.85}O_7$/Kaolin, were tested for $CO_2$ reforming of methane at 800° C. and 1 bara pressure. Both catalysts showed very good activity over a period of 180 and 100 hours respectively (see FIG. 9 (20% La6.5% Ni/Kaolin) and FIG. 10 (20% $La_2Rh_{0.11}Zr_{1.85}O_7$/Kaolin)). Both catalysts were prepared according to the procedures used in Example 1.

The performance of both of these catalysts were tested in a highthroughput reactor system supplied by HTE, Germany. Reactors were of plug flow type and made up of steel SS316, with an inner ceramic liner. Ceramic liner with 5 mm in diameter and 55 cm in length was used to avoid coking due to methane cracking on steel surface. The gas between the inner steel surface and outer ceramic liner wall was sealed with the help of leak proof graphite ferrule, which ensures 100% feed gas passes through ceramic liner containing catalyst and inert material. Catalyst pellets were crushed and sieved between 100-300 μm. A required amount of catalyst sieve fraction was placed on top of inert material inside the ceramic liner. A mixture of (45% $CO_2$+45% $CH_4$+10% Ar) was used as feed. Argon was used as an internal standard for GC analysis. Each catalyst in oxidized state was heated to 800° C. in the presence of (90% $N_2$+10% Ar). The ($CH_4$+$CO_2$) mixture was dosed in 4 steps with 5 minutes intervals replacing equivalent amount of nitrogen in each step. All catalysts were tested at 800° C., 1 bar pressure and approximately gas hourly space velocity (GHSV)=25,000 h-1. After reaching feed composition of (45% $CO_2$+45% $CH_4$+10% Ar), gas analysis was started after 1 hour of equilibration time. Agillent GC 7867 was used for gas analysis. Methane and $CO_2$ conversion was calculated as follows, $$\text{Methane conversion} = \frac{\text{mol of methane converted}}{\text{mol of methane in feed}} \times 100$$

$$\text{Carbon dioxide conversion} = \frac{\text{mol of carbon dioxide converted}}{\text{mol of carbon dioxide in feed}} \times 100$$

The ratio of hydrogen to carbon monoxide is calculated as follows, $$\text{H2/CO} = \frac{\text{mol of Hydrogen in product}}{\text{mol of carbon monoxide in product}}.$$

Figure 9:
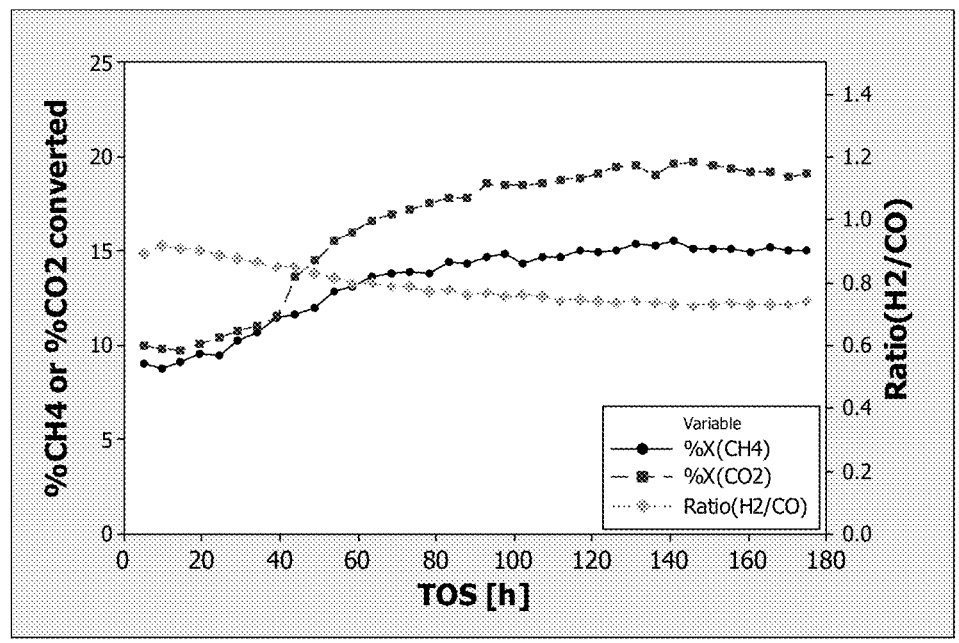
FIG. 9: Performance of 20% La6.5% Ni/Kaolin catalyst: $CH_4$ and $CO_2$ conversion; and $H_2$/CO ratio obtained at 800° C., 1 bara and GHSV=73,000 $h^{-1}$. Gas mixture containing 45% $CH_4$+45% $CO_2$+10% Ar was used as feed.
Figure 10:
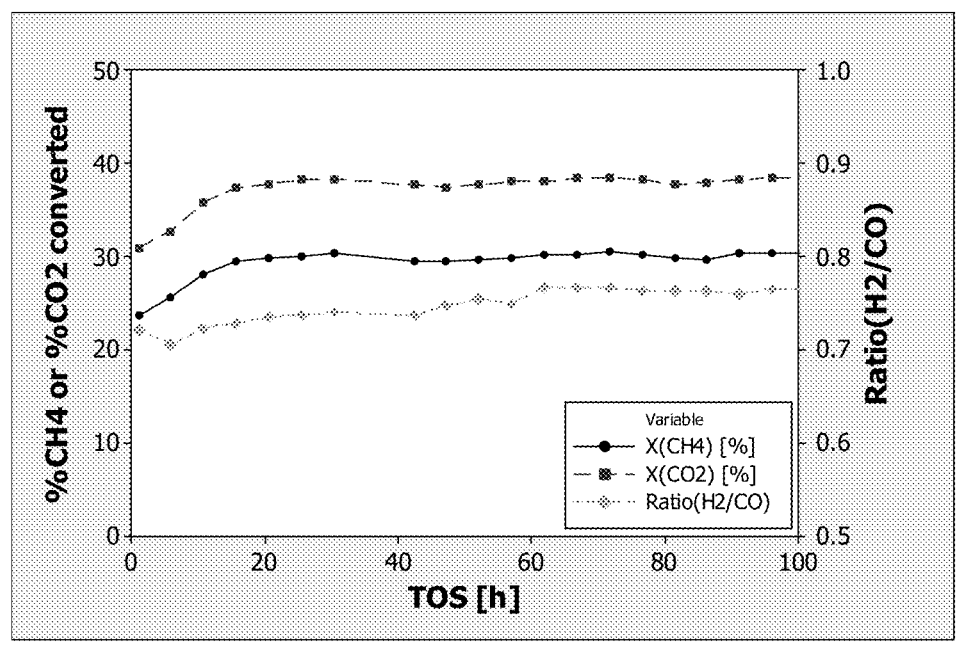
FIG. 10: Performance of 20% $La_2Rh_{0.11}Zr_{1.85}O_7$/Kaolin catalyst: $CH_4$ and $CO_2$ conversion; and $H_2$/CO ratio obtained at 800° C., 1 bara and GHSV=73,000 $h^{-1}$. Gas mixture containing 45% $CH_4$+45% $CO_2$+10% Ar was used as feed.

In the case of (20% La6.5% Ni/Kaolin) and (20% $La_2Rh_{0.11}Zr_{1.85}O_7$/Kaolin), the $H_2$/CO ratio obtained was ≈0.75 (See FIGS. 9 and 10). This is because of reverse water gas shift reaction ($CO_2$+$H_2$=CO+$H_2O$). The reverse water gas shift reaction is dependent on methane and $CO_2$ conversion, at higher conversion shift reaction reaches equilibrium giving higher $H_2$/CO ratio. So, $H_2$/CO ratio is not catalyst specific. The $H_2$/CO ratio near to 1 can be obtained by increasing the $CH_4$ and $CO_2$ conversion by decreasing the GHSV, $h^{-1}$ of the catalytic reaction.

The invention claimed is:

1. A hydrocarbon gas reforming supported catalyst comprising:
    (a) a catalytic material capable of catalyzing the production of a gaseous mixture comprising hydrogen and carbon monoxide from a hydrocarbon gas; and
    (b) a clay support material comprising a clay mineral, wherein the catalytic material is chemically bonded to the clay support material, and wherein the chemical bond is a M1-M2 bond, where M1 is a metal from the catalytic material and M2 is a metal from the clay support material, or the chemical bond is a M1-O bond, where M1 is a metal from the catalyst and oxygen (O) is from the clay support material,
    wherein the supported catalyst comprises at least 90% or more by weight of the clay support material.

2. The hydrocarbon gas reforming supported catalyst of claim 1, wherein the clay mineral comprises a 1:1 silicate layer or 2:1 silicate layer.

3. The hydrocarbon gas reforming supported catalyst of claim 2, wherein the clay mineral comprises a 1:1 silicate layer.

4. The hydrocarbon gas reforming supported catalyst of claim 3, wherein the clay mineral is a kaolin mineral.

5. The hydrocarbon gas reforming supported catalyst of claim 4, wherein the kaolin mineral is kaolinite.

6. The hydrocarbon gas reforming supported catalyst of claim 1, wherein the clay support material is in particulate or powdered form.

7. The hydrocarbon gas reforming supported catalyst of claim 6, wherein the particle size of the clay support material ranges from 5 to 300 μm.

8. The hydrocarbon gas reforming supported catalyst of claim 1, wherein the clay support material is in non-powdered form or has a fabricated geometry.

9. The hydrocarbon gas reforming supported catalyst of claim 8, wherein the fabricated geometry is a pellet, foam, honeycomb, or monolith.

10. The hydrocarbon gas reforming supported catalyst of claim 1, wherein the catalytic material is a metal catalyst or a metal oxide catalyst.

11. The hydrocarbon gas reforming supported catalyst of claim 10, wherein the metal catalyst or metal oxide catalyst comprises Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof.

12. The hydrocarbon gas reforming supported catalyst of claim 11, wherein the metal catalyst comprises Ni, Pt, Rh, or Ru or any combination thereof.

13. The hydrocarbon gas reforming supported catalyst of claim 1, wherein the clay mineral is a purified or isolated clay mineral or a synthetic clay mineral.

14. The hydrocarbon gas reforming supported catalyst of claim 1, wherein the supported catalyst comprises at least 1%, or more by weight of the catalytic material.

15. The hydrocarbon gas reforming supported catalyst of claim 1, wherein the supported catalyst comprises 5% to 10% by weight of the catalytic material and 95% to 90% by weight of the clay support material.

16. The hydrocarbon gas reforming supported catalyst of claim 1, wherein the catalytic material is dispersed on the surface of the clay support material.

17. The hydrocarbon gas reforming supported catalyst of claim 1, wherein the supported catalyst is capable of reducing carbon formation on the surface of said supported catalyst when subjected to temperatures at a range of greater than 700° C. to 1100° C.

18. The hydrocarbon gas reforming supported catalyst of claim 1, wherein the supported catalyst is capable of reducing sintering of the catalytic material or of the clay support material when subjected to temperatures at a range of greater than 700° C. to 1100° C.

19. The hydrocarbon gas reforming supported catalyst of claim 1, wherein the catalytic material comprises a pyrochlore of:

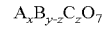

wherein, A is a trivalent ion of an element of La, Ce, Nd, Bi, Sc, or Y, where 0 ≤x≤2, B is a tetravalent ion of an element of Zr, Pt, Pd, Ni, Mo, Rh, Ru, or Ir, where 0≤y−z ≤ 2, C is a bivalent, trivalent or tetravalent ion of Ba, Ca, Cu, Mg, Ru, Rh, Pt, Pd, Ni, Co, or Mo, where 0≤z ≤2.

20. The hydrocarbon gas reforming supported catalyst of claim 1, wherein the catalytic material comprises $La_2Ni_{0.11}Zr_{1.89}O_7$ or $La_2Rh_{0.11}Zr_{1.85}O_7$ and the clay support material comprises kaolinite.

21. The hydrocarbon gas reforming supported catalyst of claim 1, wherein the hydrocarbon gas is methane.

22. The hydrocarbon gas reforming supported catalyst of claim 1, wherein the clay support material consists essentially of the clay mineral.

23. The hydrocarbon gas reforming supported catalyst of claim 1, wherein the clay support consists of the clay mineral.

24. A method of producing the hydrocarbon gas reforming supported catalyst of claim 1 comprising obtaining a composition comprising:
   (a) a continuous phase comprising a solvent and a catalytic material capable of catalyzing the production of a gaseous mixture comprising hydrogen and carbon monoxide from a hydrocarbon gas, wherein the catalytic material is solubilized in the solvent; and
   (b) a dispersed phase comprising a clay mineral in powdered or particulate form; and
   evaporating the solvent from said composition, wherein the hydrocarbon gas reforming supported catalyst is produced, and wherein the catalytic material attached chemically bonded to the support material, and wherein the chemical bond is a M1-M2 bond, where M1 is a metal from the catalytic material and M2 is a metal from the clay support material, or the chemical bond is a M1-O bond, where M1 is a metal from the catalyst and oxygen (O) is from the clay support material.

25. A method of catalytically reforming a reactant gas mixture comprising:
   (a) providing a reactant gas mixture comprising a hydrocarbon and an oxidant;
   (b) providing the hydrocarbon gas reforming supported catalyst of claim 1; and
   (c) contacting the reactant gas mixture with the hydrocarbon gas reforming supported catalyst under conditions sufficient to produce a gaseous mixture comprising carbon monoxide and hydrogen.

26. The method of claim 25, wherein the hydrocarbon comprises methane and the oxidant comprises carbon dioxide or a mixture of carbon dioxide and oxygen.

27. The method of claim 26, wherein the ratio of carbon monoxide to hydrogen in the produced gaseous mixture is approximately 1.

28. The method of claim 27, wherein the hydrocarbon comprises methane and the oxidant comprises water.

29. The method of claim 28, wherein the water is water vapor.

30. The method of claim 29, wherein the ratio of carbon monoxide to hydrogen in the produced gaseous mixture is approximately 0.33.

31. The method of claim 25, further comprising contacting the reactant gas mixture with the hydrocarbon gas reforming supported catalyst at a temperature ranging from 700° C. to 1100° C., at a pressure ranging from 1 bara to 30 bara, and at a gas hourly space velocity (GHSV) ranging from 500 to 10000 $h^{-1}$.

* * * * *